Patented Oct. 13, 1925.

1,557,349

UNITED STATES PATENT OFFICE.

JOSEF SICHERT, OF ROGASKA-SLATINA, YUGOSLAVIA.

PROCESS AND MEANS FOR PREVENTING THE FORMATION OF HARD SCALES IN BOILERS AND FOR REMOVING SCALES ALREADY EXISTING.

No Drawing. Application filed August 17, 1923. Serial No. 657,946.

*To all whom it may concern:*

Be it known that I, JOSEF SICHERT, a subject of the King of the Serbs, Croats, and Slovenes, residing at Rogaska-Slatina, Yugoslavia, have invented certain new and useful Improvements in a Process and Means for Preventing the Formation of Hard Scales in Boilers and for Removing Scales Already Existing, of which the following is a specification.

This invention relates to a process and means for preventing the formation of hard scale in boilers and for removing scale already existing therein.

According to my invention both these results are obtained by adding to the feed water previous to being introduced into the boiler or to the boiler water resins and a relativey small per cent of organic colloids exercising a protective action on the resins and having the property of causing the resins to form emulsions or colloidal solutions with the boiler water under the conditions of pressure (above the atmospheric) and of temperature (above 100 centigrade) existing in the boiler when normally operated. For imparting to the resin the property of passing into said fine state of dispersion within the boiler water, especially colloidal additions such as gums, soaps, mucilage and the like are suitable. Furthermore there are certain resins which in their natural state are adapted for the purpose aimed at, as for instance the gum-resins, which—by themselves—are progressively soluble in hot water owing to the fact that they contain certain species of gum as natural constituents. A material extraordinarily adapted for carrying out this invention is e. g. olibanum, the well known incense used for a long time as a fumigant, which contains about 50 to 60% of resin, 20 to 30% of gum and 3 to 7% of volatile oils. A mixture of colophony and 4% of resin-soap has about the same efficiency as olibanum. Also an intimately triturated mixture of 2 parts of colophony or dammar-resin with 1 part of gum arabic, tragacanth or agaragar gives very satisfactory results, although the efficiency of the natural resin olibanum is somewhat superior to that of the last named mixture.

For obtaining a perfectly satisfactory result, very small quantities of the agents to be added for a certain period of time (e. g. several weeks) are sufficient, which small quantities depend substantially upon the boiler capacity; the amount of water which will be evaporated is of influence only in so far as by more frequently drawing off the sludge more of the resin is removed with the latter. If for instance olibanum is introduced into a boiler, which is in operation and has a relatively thick layer of scale, at the rate of 20 grammes of olibanum to every 1,000 litres of the capacity of the boiler, the scale will be loosened and partly detached within about a week. If thereafter the walls of the boiler are scrubbed by a sharply projected jet of water and the boiler is set to work again, the scale will decay within a period of 3 to 4 weeks and will be reduced to sludge. Regular introduction of olibanum, made at intervals of about 4 weeks, will prevent the formation of scale, as the salts which otherwise would form the scale, cannot adhere to the walls of the boiler and are from the very beginning separated and expelled in the form of sludge. The amount required, when the water has a higher degree of hardness, may be increased up to 40 grammes of olibanum to every 1,000 litres of the boiler capacity. A still greater amount is only to be employed if the water is exceedingly hard. If the boiler is new or well cleaned, 10 grammes of the gum resin will be sufficient for each 1,000 litres of the boiler capacity.

If the agents are to be introduced into the boiler by means of the cold feed water, they should first be dissolved in a solvent miscible with water, as for instance alcohol. In this case the feed water acts only as a carrier, conveying the agents into the boiler, where the action does not set in but at high temperature and under pressure.

As only very small quantities of the effective agent need be used for obtaining satisfactory results, the process is very inexpensive. Furthermore, as the resins are not liable to exercise any objectionable influence on iron and other metals, glass, caoutchouc or stuffing materials, no inconveniences arise in carrying out the process.

What I claim is:

1. A process for preventing the formation of hard scale in boilers and for removing scale already existing which process consists in adding to the feed water previous to being introduced into the boiler or to the boiler water resins and a relatively small per cent of organic colloids exercising a protective action on the resins, said colloids having the property of causing the resins to form emulsions or colloidal solutions with the boiler water under the conditions of pressure (above the atmospheric) and of temperature (above 100 centigrade) existing in the boiler when normally operated.

2. A process for preventing the formation of hard scale in boilers and for removing scale already existing which process consists in adding to the feed water previous to being introduced into the boiler or to the boiler water an amount of resins depending upon the boiler capacity and beside the resins only a relatively small per cent of organic colloids exercising a protective action on the resins, said colloids having the property of enabling the resins to form a high disperse system with the boiler water under the conditions of pressure (above the atmospheric) and of temperature (above 100 centigrade) existing in the bolier when normally operated.

3. The process for preventing the formation of hard scale in boilers and for removing scale already existing which process consists in emulsifying resins with the boiler water by means of organic protective colloids.

4. A process for preventing the formation of hard scale in boilers and for removing scale already existing which process consists in adding to the feed water previous to being introduced into the boiler or to the boiler water a mixture of resins and of a relatively small per cent of gums.

5. The process for preventing the formation of hard scale in boilers and for removing scale already existing which process consists in introducing into the feed water previous to being introduced into the boiler or into the boiler water natural gum-resins.

6. The process for preventing the formation of hard scale in boilers and for removing scale already existing which process consists in introducing into the feed water previous to being introduced into the boiler or into the boiler water the natural gum resin called olibanum.

In testimony whereof I have affixed my signature.

JOSEF SICHERT.